United States Patent
Docimo

(10) Patent No.: US 8,646,985 B2
(45) Date of Patent: Feb. 11, 2014

(54) SEALED SPHERICAL ROLLER BEARING ASSEMBLY

(75) Inventor: Rocco Docimo, Stamford, CT (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/375,970

(22) PCT Filed: May 28, 2010

(86) PCT No.: PCT/EP2010/003266
§ 371 (c)(1),
(2), (4) Date: Mar. 1, 2012

(87) PCT Pub. No.: WO2010/139432
PCT Pub. Date: Dec. 9, 2010

(65) Prior Publication Data
US 2012/0155792 A1 Jun. 21, 2012

Related U.S. Application Data

(60) Provisional application No. 61/184,593, filed on Jun. 5, 2009.

(51) Int. Cl.
F16C 33/76 (2006.01)

(52) U.S. Cl.
USPC .............................. 384/486; 384/480; 384/558

(58) Field of Classification Search
USPC ......... 384/477, 478, 480, 481, 482, 484, 485, 384/486, 556, 538
See application file for complete search history.

(56) References Cited

U.S. PATENT DOCUMENTS

| | | | |
|---|---|---|---|
| 2,353,988 A | | 7/1944 | Batesole |
| 3,341,265 A | * | 9/1967 | Paterson ...................... 384/486 |
| 3,751,124 A | | 8/1973 | Hanson |
| 3,957,319 A | * | 5/1976 | Gorski .......................... 384/556 |
| 4,978,236 A | * | 12/1990 | Ostling ......................... 384/583 |
| 5,695,290 A | | 12/1997 | Mondak |
| 5,908,249 A | | 6/1999 | Nisley et al. |
| 7,458,727 B2 | * | 12/2008 | Niebling et al. ............... 384/448 |
| 2003/0063824 A1 | * | 4/2003 | Aldridge ....................... 384/477 |
| 2007/0201782 A1 | * | 8/2007 | Miyagawa et al. ............ 384/486 |
| 2009/0226125 A1 | * | 9/2009 | Ishii .............................. 384/486 |
| 2011/0044569 A1 | * | 2/2011 | Haepp et al. .................. 384/480 |
| 2011/0129176 A1 | * | 6/2011 | Koma et al. ................... 384/484 |
| 2011/0216993 A1 | * | 9/2011 | Mason et al. .................. 384/478 |
| 2011/0262069 A1 | * | 10/2011 | Baba et al. ..................... 384/486 |

FOREIGN PATENT DOCUMENTS

DE 79 35 867 U1 3/1980

* cited by examiner

Primary Examiner — Thomas R Hannon
(74) Attorney, Agent, or Firm — Lucas & Mercanti, LLP

(57) ABSTRACT

A sealed spherical roller bearing assembly, having an outer ring with a seal groove and an inner ring with a central bore. A plurality of rolling elements is arranged between the inner ring and the outer ring. A seal is provided that has a sealing element on an outer diameter of the seal, which sealing element engages in the seal groove in the outer ring.

5 Claims, 6 Drawing Sheets

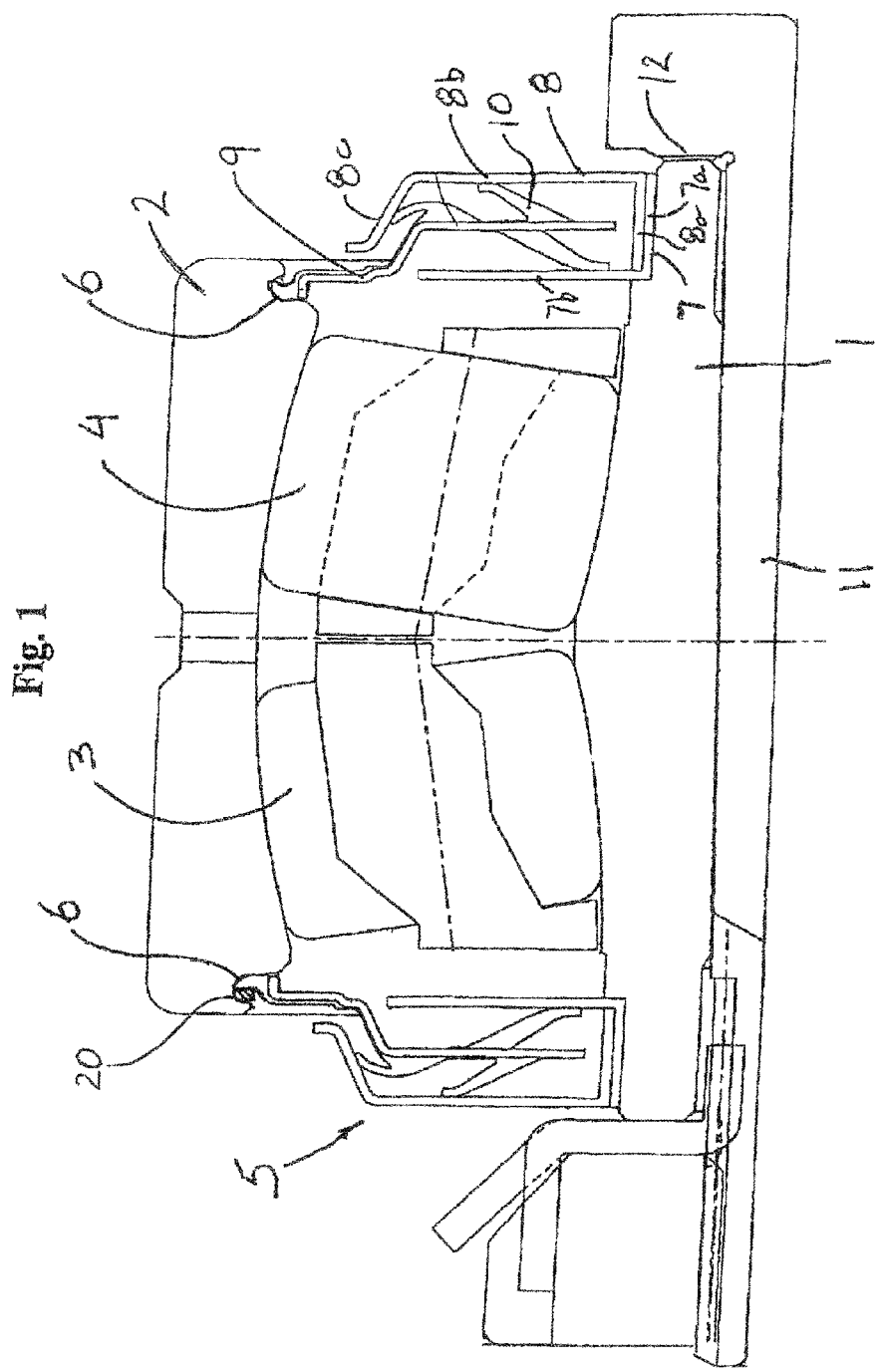

SEALED SPHERICAL ROLLER BEARING ASSEMBLY

CROSS-REFERENCE TO RELATED APPLICATIONS

This application is a 371 of PCT/EP2010/003266 filed May 28, 2010, which in turn claims the priority of U.S. 61/184,593 filed Jun. 5, 2009. The priority of both applications is hereby claimed and the applications are incorporated by reference herein.

BACKGROUND OF THE INVENTION

The present invention relates to sealed spherical roller bearings. Spherical roller bearings are generally used whenever there is a likelihood that axial misalignment will occur. The internal arrangement of spherical roller bearings allows the inner ring of the bearing to become axially misaligned with the outer ring of the bearing while still maintaining the ability of the bearing to provide reduced rolling friction.

The arrangement of the internal components of the spherical roller bearing presents special problems with regard to sealing the bearing from outside contaminants as well as retention of lubricants within the bearing. Most bearing seals use a relatively solid seal member which is firmly attached to either the inner ring or the outer ring of the bearing, with the other edge of the seal in wiping contact with the rotating race.

In one type of prior art sealed spherical roller bearing, the seal is pressed into a groove of the outer ring which can often result in the outer ring being deformed during installation. This deformation results in high operating temperatures of the bearing, noise, vibration, lubricant leakage, as well as premature bearing failure.

One specific example for a seal arrangement for a bearing assembly is disclosed in U.S. Pat. No. 5,908,249. This seal arrangement has a plurality of primary seals that include a rolled riding seal and an oblique contact seal with a centered lip arranged therebetween.

SUMMARY OF THE INVENTION

Accordingly, it is an object of the present invention to provide a sealed spherical roller bearing that avoids the problems discussed above associated with prior art sealed spherical roller bearings.

Pursuant to this object and others which will become apparent hereafter, one aspect of the present invention resides in a spherical roller bearing having an outer ring with a seal groove, and an inner ring having a central bore. A first plurality of rolling elements and a second plurality of rolling elements are arranged between the inner ring and the outer ring. An adapter sleeve, having a central bore for mounting on a shaft is also provided. The inner ring is mounted on the adapter sleeve, engages in the seal groove of the outer ring and covers an axially outwardly facing space between the outer ring and the inner ring so as to enclose the rolling elements and lubricant provided around the rolling elements. The seal can be either a contact (FIG. 1) or labyrinth seal (FIG. 1a). During mounting, the bearing is pushed onto the adapter sleeve until the face of the inner ring of the bearing is tight against a shoulder of the adapter sleeve. This position is achieved by a predetermined axial drive-up distance of the inner ring onto the adapter sleeve. This ensures an exact radial internal clearance reduction and a required fit on the shaft.

By utilizing the adapter sleeve, easier mounting and dismounting is possible with higher precision and the avoidance of damage to the outer ring.

The seal of the present invention, in one embodiment, is a labyrinth seal made up of essentially three components. First is an inner component having, in cross-section, an L-shaped configuration. A short side of the L rests against a radial outer surface of the inner ring and a long side of the L extends toward the outer ring. The second component is an outer, substantially L-shaped (in cross-section) component having a short side that rests on top of the short side of the inner component and a long side that extends in the direction of the outer ring. The long sides of the L-shaped components are parallel and spaced from one another. An upper end of the long side of the outer component is angled toward the outer ring. The third component is an intermediate component having an annular shape with an outer edge that engages in the seal groove in the outer ring. This component can be also fixed in the outer ring seal groove with a retaining ring. From this outer peripheral edge, the intermediate component extends toward the inner ring and is angled an as to be between and substantially equally spaced from the outer component and the inner component, thus compensating for shaft deflections and misalignment of the bearing seats. Sealing elements extend from the intermediate component toward the inner component and the outer component so as to maintain the sealing of the intermediate component between the other two components. In this way, a contact labyrinth seal is provided from the interior of the bearing to the outside of the bearing.

In another embodiment, the sealing elements between the components are omitted so that the seal is a non-contact labyrinth seal.

The bearing can have either a cylindrical bore or a tapered bore. When a tapered bore is present, the end of the inner ring with the larger bore diameter is pushed tight against the adapter sleeve shoulder.

In a further embodiment of the invention, passages are provided internally in the adapter sleeve so as to allow connection of a source of hydraulic fluid so as to facilitate hydraulic mounting and dismounting of the bearing and the adapter sleeve.

In still a further embodiment of the invention, the seal can be a plate engaged in the seal groove of the outer ring, which plate extends toward the inner ring. At a distal end of the plate there are provided a plurality of wiper elements which extend from the plate and engage in the radially outer surface of the inner ring in a sliding manner. The wipers, together with the plate, form a sealing element to keep contaminants away from the rolling elements while at the same time retaining lubricant in the rolling elements.

In another embodiment of the invention, the seal is a plate extending radially from the inner ring toward the outer ring. A rubber seal is affixed to an axially inner side of the plate near the peripheral edge, which rubber seal has contact along a surface of the outer ring. The plate is held in position by a snap ring provided in the seal groove of the outer ring. The snap ring contacts an axially outer surface of the plate at the peripheral outer edge thereof. In this embodiment, the adapter sleeve is constructed so as to have a projection that extends axially inwardly toward the plate so as to maintain the plate in position.

Further advantages, features and details of the invention are revealed in the following description of the invention with the aid of the drawings.

BRIEF DESCRIPTION OF THE DRAWINGS

FIG. 1 is a cross section through the bearing of the invention;

DETAILED DESCRIPTION OF THE INVENTION

Figure 1A:
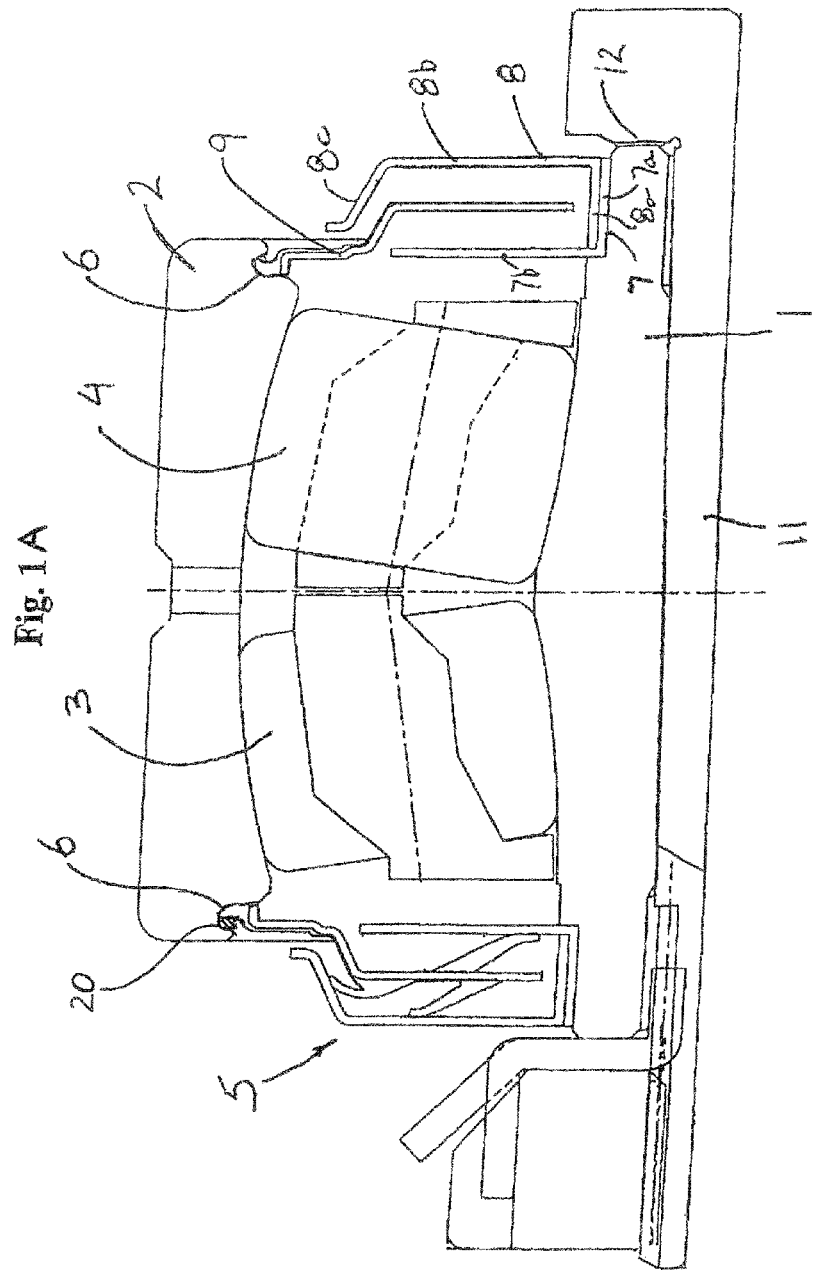
FIG. 1a is a view as in FIG. 1 of another embodiment of the labyrinth seal.

FIG. 1 shows an axial cross section through a sealed spherical roller bearing assembly according to the present invention. The roller bearing has an inner ring 1 and an outer ring 2. A first plurality of rolling elements 3 and a second plurality of rolling elements 4 are arranged between the inner ring 1 and the outer ring 2. The outer ring has an annular seal groove 6.

The seal 5 shown in FIG. 1 is a labyrinth contact seal having three components. The first is an inner component 7 that is L-shaped. The L-shape has a short leg 7a attached to a radial outer surface of the inner ring 1, and a long leg 7b perpendicular to the short leg 7a and extending toward the outer ring 2. The seal 5 further includes an L-shaped outer component 8. The outer component has a short leg 8a that is attached to an outer radial surface of the short leg 7a of the inner component 7. A long leg 8b extends perpendicularly from the short leg 8a in the direction of the outer ring 2 so that the long leg 8b is parallel to and at a distance from the long leg 7b of the inner component 7. The long leg 8b has an end section 8c that is angled toward the outer ring 2. An intermediate component 9 extends inwardly from the seal groove 6 of the outer ring 2 in the direction of the inner ring 1. The intermediate component 9 is angled so as to extend substantially midway between the long leg 8b of the outer component 8 and the long leg 7b of the inner component 7, to thereby form a labyrinth seal between the interior region of the bearing and the outer environment. Sealing elements 10 project from the intermediate component 9 so as to maintain the position of the intermediate component 9 between the inner component 7 and the outer component 8, and thus compensating for shaft deflections and misalignment of the bearing seats. A retaining or snap ring 20 can be used to hold the intermediate component 9 in the groove 6.

The inner ring 1 is mounted on an adapter sleeve 11 that is mountable on a shaft. The adapter sleeve 11 has an axially inwardly directed shoulder 12 against which an axially outer surface of the inner ring 1 abuts when the inner ring 1 is mounted on the sleeve 11.

Figure 2:
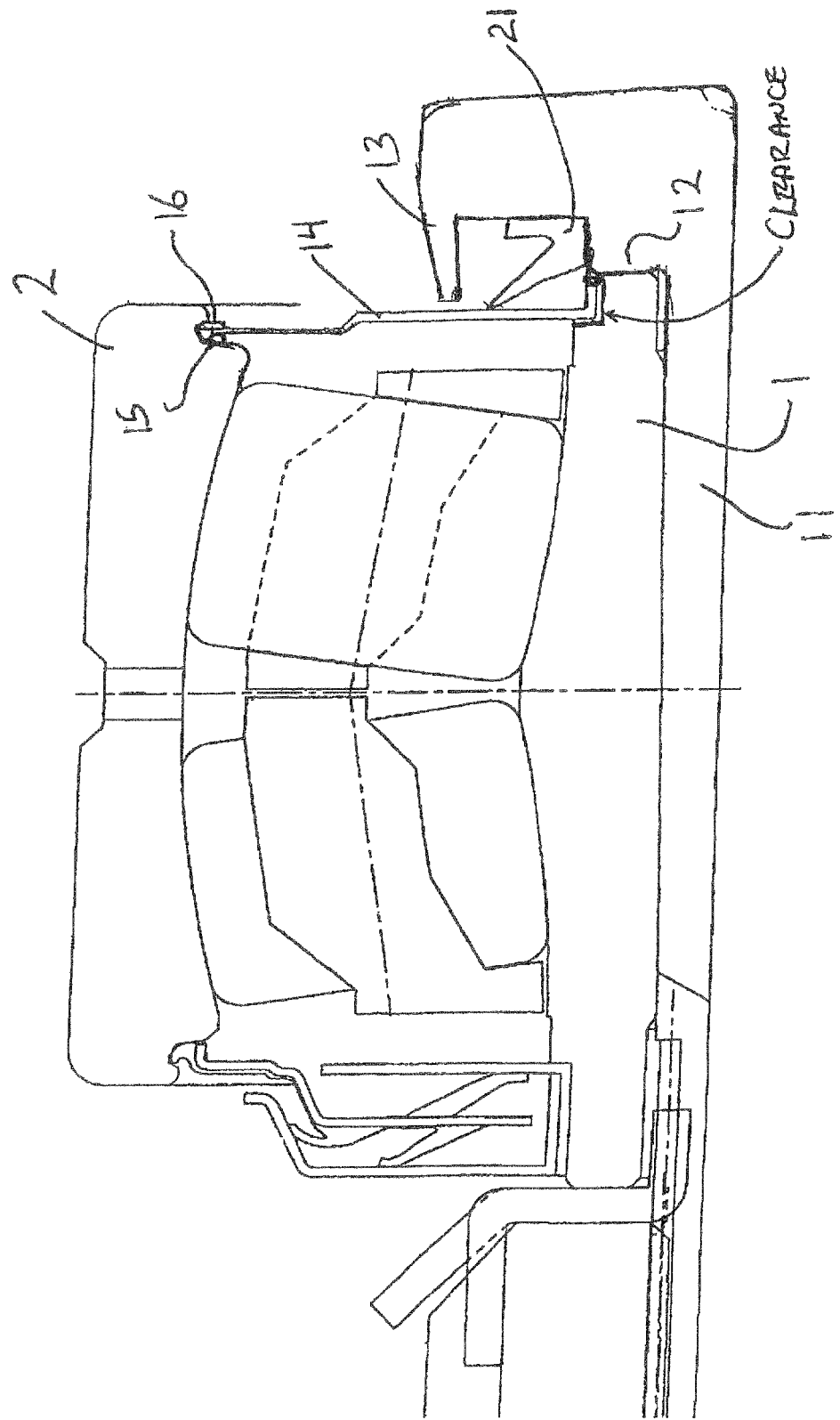
FIG. 2 is a view as in FIG. 1 of another embodiment of the seal.

The seal in FIG. 1a is the same as in FIG. 1 without the sealing elements 10. FIG. 2, on the right side of the drawing, shows an alternative embodiment of the seal and the adapter sleeve, In this embodiment, the seal has a plate 14 that projects from the outer ring 2 toward the inner ring 1. A rubber sealing ring 15 is provided at the outer peripheral edge of the plate 14 on an axially inner side of the plate so that the rubber ring 15 can engage the outer ring 2. A snap ring 16 is provided in the seal groove 6 so as to contact an axially outer side of the plate 14 and maintain the position of the plate 14 relative to the outer ring 2. The adapter sleeve 11, in this embodiment, has an axially, inwardly directed projection 13 extending toward the outer surface of the plate 14 so as to protect the seal 21. The seal 21 is mounted on the sleeve 11 and has a projecting edge in contact with the plate 14.

Figure 3:
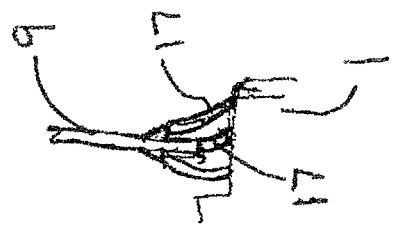
FIG. 3 shows a detail of another embodiment of the seal.

FIG. 3 shows yet another embodiment of the seal. In this embodiment the intermediate component 9 has at least one elastomeric wiper 17 provided on or near the inner peripheral edge of the intermediate component 9. The wipers 17 engage the radially outer surface of the inner ring 1 to provide a sliding contact therewith. It should be noted that, although the wipers 17 are shown on an intermediate component of the seal, with such a construction it is possible in certain situations to utilize only the intermediate component as the seal and do away with both the inner component 7 and the outer component 8.

Figure 4:
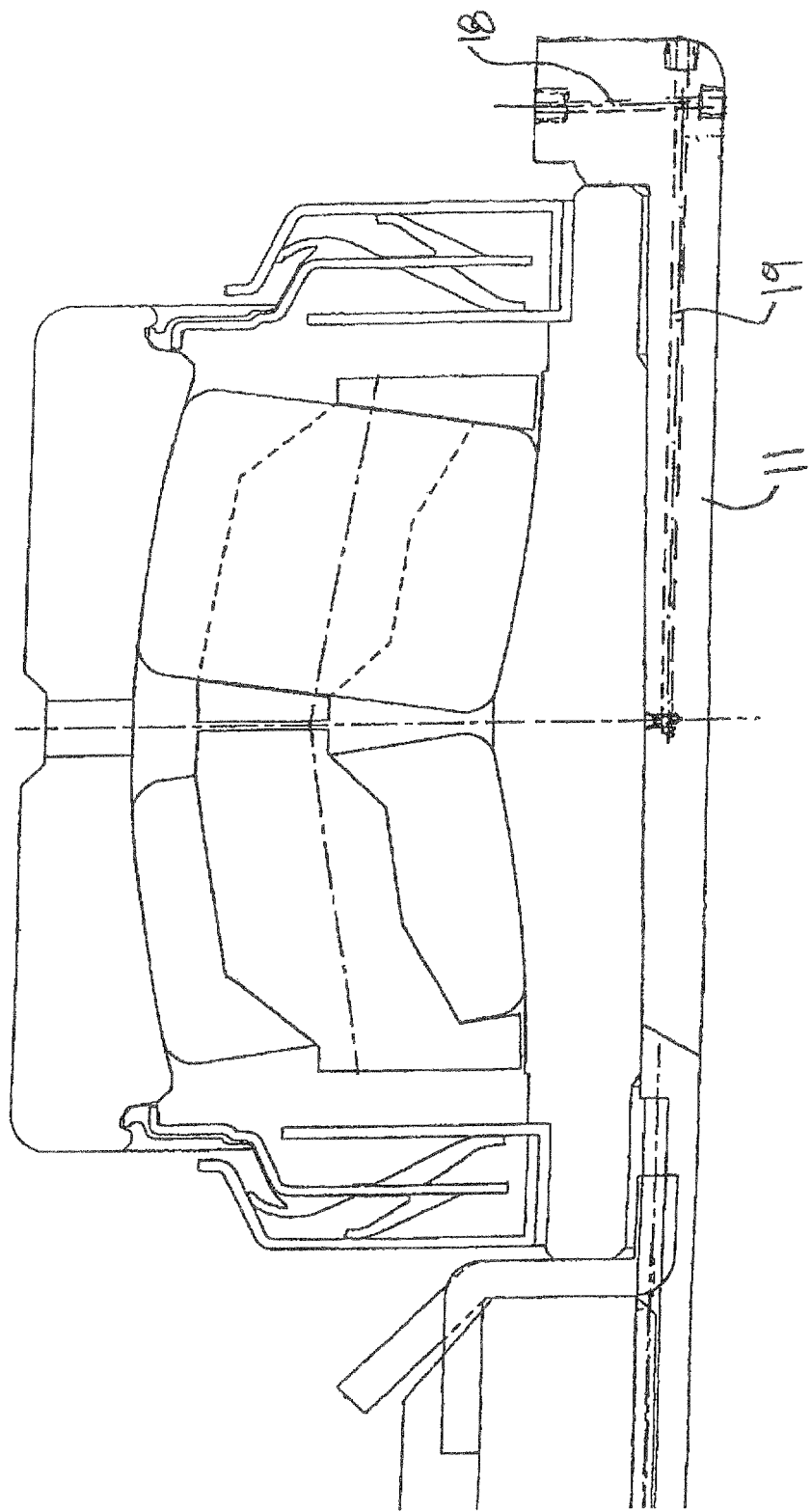
FIG. 4 is a view as in FIG. 1 of anther embodiment of the hydraulic adapter sleeve.

FIG. 4 shows an embodiment in which channels 18, 19 are provided in the adapter sleeve 11. These channels exit at points along the adapter sleeve 11 so that hydraulic fluid can be supplied to the channels to facilitate mounting and dismounting of the bearing on the adapter sleeve 11.

Figure 5:
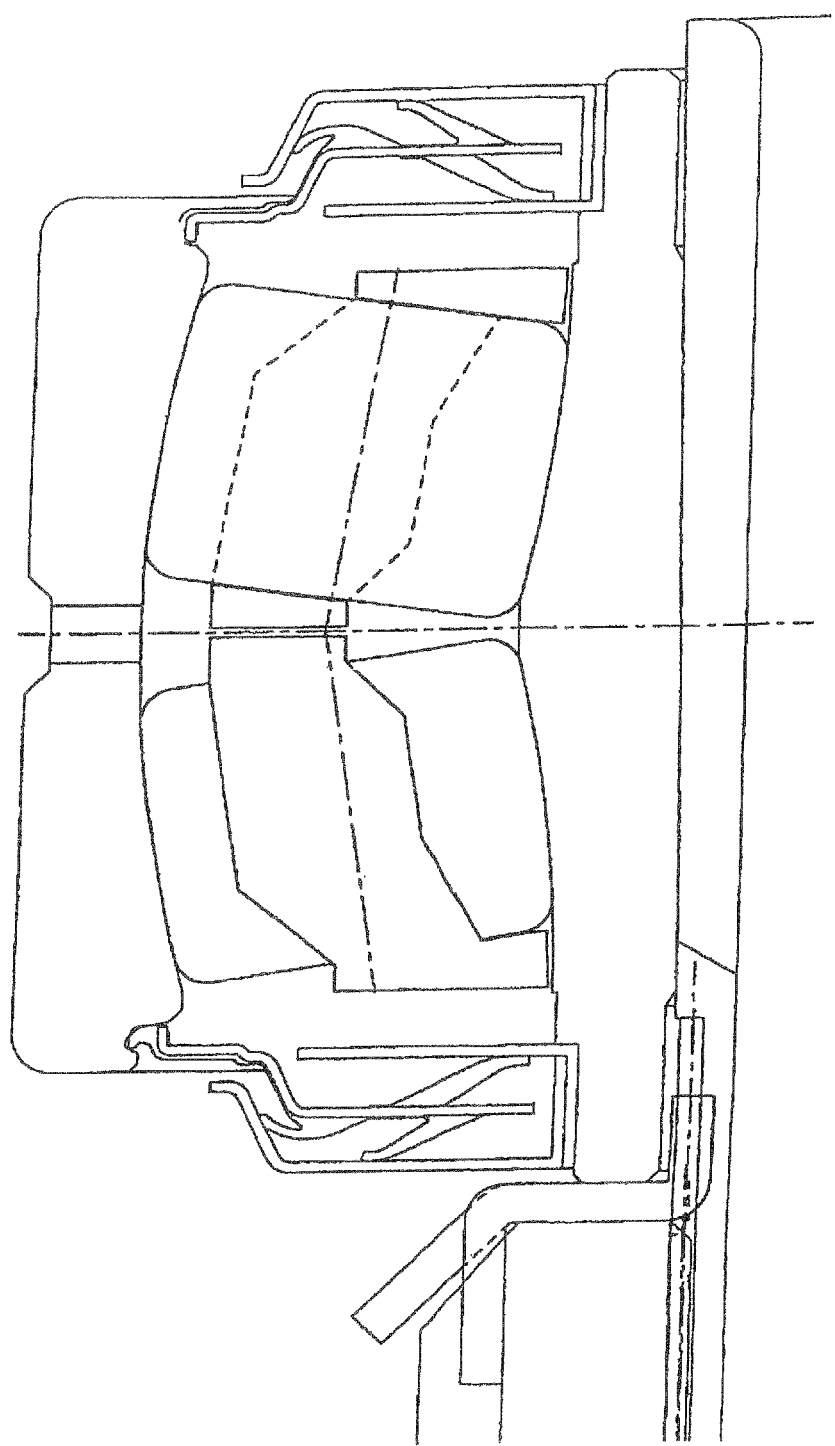
FIG. 5 is a view as in FIG. 1 showing a dry mounting of the bearing.

FIG. 5 shows a dry mounting of the bearing.

Although the present invention has been described in relation to particular embodiments thereof, any other variations and modifications and other uses will become more apparent to those skilled in the art. It is preferred, therefore, that the present invention be limited not by the specific disclosure herein, but only by the appended claims.

The invention claimed is:

1. A sealed spherical roller bearing assembly, comprising:
an outer ring having a seal groove;
an inner ring having a central bore;
a plurality of rolling elements arranged between the inner ring and the outer ring, the inner ring and the outer ring having an internal arrangement of a spherical roller bearing;
a seal having a sealing element at an outer diameter of the seal, which sealing element engages in the seal groove in the outer ring;
an L-shaped inner component and an L-shaped outer component, the inner and outer components each having a short leg attached to an outer radial surface of the inner ring and a long leg extending perpendicularly from the short leg in a direction of the outer ring, the long legs being parallel to and spaced from one another, and an intermediate component extending from the outer ring centrally between the long legs of the inner and outer components; and
sealing elements provided in a radially inner region of the intermediate component and extending from the intermediate component toward the long legs of the inner and outer components so as to maintain positioning of the intermediate component between the inner and outer components.

2. The roller bearing assembly according to claim 1, wherein the long leg of an outer component has a radially outer end region that is angled toward the outer ring.

3. The roller bearing assembly according to claim 1, and further comprising an adapter sleeve, the inner ring being mounted on the adapter sleeve, the adapter sleeve having an axially inwardly directed shoulder that abuts an axially outer surface of the inner ring.

4. The roller bearing assembly according to claim 3, wherein a passage for hydraulic fluid is provided in the adapter sleeve.

5. The roller bearing assembly according to claim 1, wherein a seal is provided at both axial ends of the outer ring.

* * * * *